(12) United States Patent
Morgan

(10) Patent No.: US 7,455,256 B2
(45) Date of Patent: Nov. 25, 2008

(54) SEATBELT RETRACTOR HAVING A CUSHIONED SENSOR ACTUATOR

(75) Inventor: Christopher D. Morgan, Sterling Heights, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 445 days.

(21) Appl. No.: 11/107,154

(22) Filed: Apr. 18, 2005

(65) Prior Publication Data

US 2006/0231666 A1  Oct. 19, 2006

(51) Int. Cl.
   *B60R 22/40* (2006.01)
(52) U.S. Cl. .................... 242/384; 242/384.5
(58) Field of Classification Search .......... 242/384.2, 242/384.5, 384.6, 384; 280/806, 807; 297/478, 297/480
   See application file for complete search history.

(56) References Cited

U.S. PATENT DOCUMENTS

| | | | |
|---|---|---|---|
| 3,930,622 A | | 1/1976 | Tanaka et al. |
| 4,040,576 A | * | 8/1977 | Walker et al. ............. 242/376.1 |
| 4,084,840 A | * | 4/1978 | Buff et al. .................. 297/478 |
| 4,166,592 A | * | 9/1979 | Barcus et al. ............ 242/384.5 |
| 4,190,213 A | * | 2/1980 | Ueda ........................ 242/383.4 |
| 4,760,975 A | * | 8/1988 | Doty ........................ 242/384.5 |
| 5,443,224 A | * | 8/1995 | Patterson et al. ......... 242/384.2 |
| 5,507,449 A | | 4/1996 | Kohlndorfer et al. |
| 6,213,420 B1 | * | 4/2001 | Kopetzky .................... 242/384 |
| 6,283,398 B1 | | 9/2001 | Specht |

FOREIGN PATENT DOCUMENTS

DE   197 58 495 A1   2/1999
WO      87/06545 A   11/1987

* cited by examiner

*Primary Examiner*—Peter M Cuomo
*Assistant Examiner*—Scott Haugland
(74) *Attorney, Agent, or Firm*—Lonnie Drayer

(57) ABSTRACT

A seatbelt retractor assembly (10) has a seatbelt retractor (14) and an actuator (26) for locking and unlocking the seatbelt retractor (1). An inertial sensor mass (30) detects changes in vehicle speed. The mass (30) has a guide surface (34) for interacting with the actuator (26). The guide surface (34) moves between an unlocking position (38) in which the actuator (26) unlocks the seatbelt retractor (14) and a locking position (42) in which the actuator (26) locks the seatbelt retractor (14). The actuator (26) has an actuator arm (25) with a surface contacting portion (54) in contact with the guide surface (34) and an open slot (57) above the surface contacting portion (54). The surface contacting portion (54) is connected to the actuator arm (25) by a beam structure (56) having a spring rate $K_{beam}$ sufficient to maintain the open slot (57) open during normal vehicle operation.

4 Claims, 5 Drawing Sheets

SEATBELT RETRACTOR HAVING A CUSHIONED SENSOR ACTUATOR

FIELD OF THE INVENTION

This invention relates to a seatbelt retractor assembly.

BACKGROUND OF THE INVENTION

A seatbelt for a passenger vehicle typically has a seatbelt retractor that serves to retract the belt into its housing. The belt is wound upon a spool in the housing. When the belt is drawn or protracted from its housing, the spool winds a retraction spring, which later retracts the unused portion of the belt onto the spool or withdraws the belt into its housing when not in use.

In the event of a crash, the seatbelt retractor has a lock that prevents the seatbelt from extending further from its housing. The lock may be actuated by an inertial sensor, which responds to changes in vehicle speed during the crash. When a large deceleration is detected, the inertial sensor triggers the lock of the seatbelt retractor to lock the spool and thereby secures the safety belt in place during the crash.

The inertial sensor has an inertial sensor mass that moves in response to changes in speed of the vehicle. This mass is mechanically linked to the lock by an actuator. When the mass moves, the actuator moves and causes movement of a locking pawl that locks the lock when the mass has moved in excess of a predetermined amount. The actuator rests on a surface of the mass. This surface is typically angled so that movement of the mass causes rapid movement of the actuator and consequently the locking pawl. While rapid movement of the components of the inertial sensor and lock are desirable for safety, this same feature causes undesirable noise during normal vehicle operation. Another source of retractor rattle involves intermittent contact between the sensor actuator and the sensor mass as the actuator bounces on the guide surface of the sensor mass, a rattle noise can be heard. Typically, this noise can be reduced by cushioning the guide surface with a soft material. This, however, can reduce the sensitivity of the sensor mass by creating undesirable friction between the contacting surfaces of the actuator and the guide surface. As an alternative noise absorbing wraps around the retractor assembly have been added which reduce audible noise levels in the passenger compartment of the vehicle. These solutions increase cost and in some cases reduce the inertial sensor's responsiveness.

A need therefore exists for a seatbelt retractor that reduces noise from the foregoing moveable parts.

SUMMARY OF THE INVENTION

Like existing seatbelt retractor assemblies, the invention has an inertial sensor that detects changes in vehicle speed. The inertial sensor has an inertial sensor mass, which is linked to a seatbelt retractor locking pawl by an actuator. The actuator moves with the mass by riding on its surface. The inventor has discovered that a significant amount of noise arises from movement of the actuator and components linked to it. Accordingly, in contrast to conventional designs, the actuator is modified to add a slight springiness to the contact sensor portion in a manner that removes objectionable high frequency noise.

The inventive seatbelt retractor assembly has a seatbelt retractor, an actuator for locking and unlocking the seatbelt retractor, and an inertial sensor mass for detecting changes in vehicle acceleration. The inertial sensor mass has a guide surface for interacting with the actuator. The guide surface is movable between an unlocking position wherein the actuator unlocks the seatbelt retractor and a locking position wherein the actuator locks the seatbelt retractor.

The actuator has a pivotal actuator arm with a surface contacting portion resting on said guide surface of the sensor mass and an open slot above the surface contacting portion.

The surface contacting portion is connected to the pivotal actuator arm by a beam structure. The surface contacting portion has a generally rounded or substantially hemispherical protruding bottom for contacting the guide surface. The open slot above the surface contacting portion extends above the generally rounded bottom portion and the beam structure.

The connecting beam structure has a spring rate $K_{beam}$, $K_{beam}$ being sufficient to keep the open slot open during normal sensor vibration. This enables the beam to be sufficiently spring like and is designed to have an oscillating frequency f defined in *Elements of Vibration Analysis*, L. Meirovitch, 1986 by $$f = \frac{1}{2\pi}\sqrt{\frac{K_{beam}}{m_{eff}}},$$

wherein $m_{eff}$ equals $F_{static}$/gravity, as seen in FIG. 3A.

The actuator can be made of plastic and molded as a unitary structure having an effective mass $m_{eff}$ with the open slot geometry optimally selected by using the parameter $$\sqrt{\frac{K_{beam}}{m_{eff}}};$$

the value of this determines the cutoff frequency f for impact noise, accordingly the spring rate $K_{beam}$ and effective mass $m_{eff}$ are determined to be at or below this cutoff frequency f. This actuator with a spring like cushioned surface contacting portion dramatically reduces rattle noises above the cutoff frequency, f which can be as low as the designer wishes however is typically kept above 300 Hz.

DETAILED DESCRIPTION OF THE INVENTION

Figure 1:
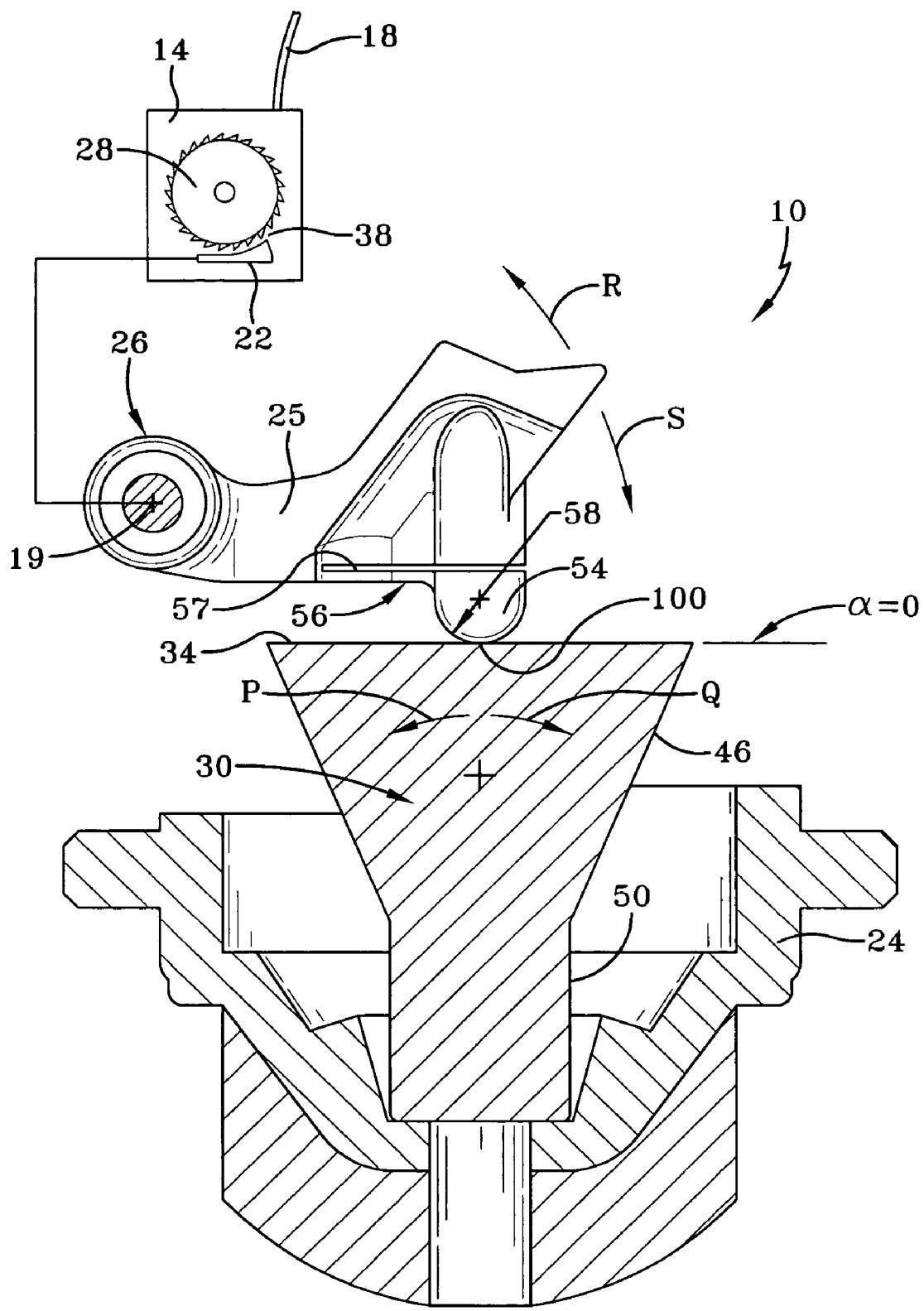
FIG. 1 is a side view of the inventive seatbelt retractor, showing a first embodiment inertial sensor mass, actuator and seatbelt retractor in an unlocked position.

FIG. 1 is a side view of an inventive seatbelt retractor assembly 10. The seatbelt retractor assembly 10 has a seatbelt retractor 14, which houses a seatbelt 18 as shown. Like conventional seatbelt retractors, the seatbelt retractor assembly 10 has a locking pawl 22, which is selectively engageable with a locking wheel 28. The locking wheel 28 has teeth to engage the locking pawl 22. When the locking pawl 22 is engaged with the locking wheel 22, the seatbelt retractor 14 prevents the seatbelt 18 from extending further from seatbelt retractor 14.

Figure 2:
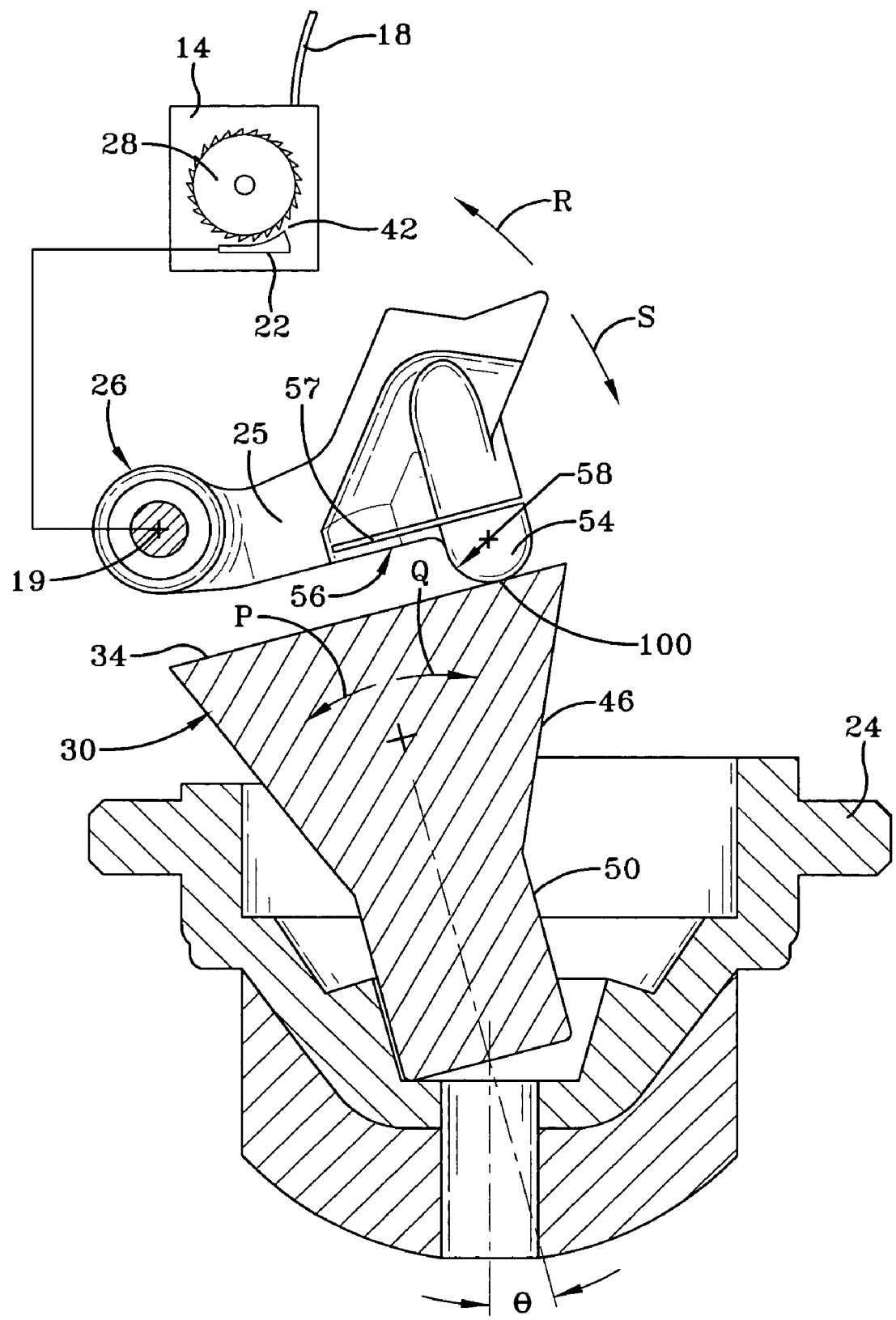
FIG. 2 is a side view of the inventive seatbelt retractor, showing a first embodiment inertial sensor mass, actuator and seatbelt retractor in a locked position.

As shown, the seatbelt retractor 14 has an inertial sensor, here an inertial sensor mass 30, which is responsive to vehicle acceleration. The inertial sensor mass 30 rests on a sensor housing 24, here shown schematically, and tips in the direction of either arrow P or arrow Q in response to vehicle acceleration. The inertial sensor mass 30 is linked to the locking pawl 22 by an actuator 26, an arm, which causes the locking pawl 22 to engage or disengage the locking wheel 28 depending upon the position of the inertial sensor mass 30. While the locking pawl 22 is shown schematically as a separate component from the actuator 26, the locking pawl 22 and actuator 26 may, in fact, be a single part. As shown in FIGS. 1 and 2, the actuator 26 interacts with a guide surface 34 through an actuator surface contacting portion 54. The actuator surface contacting portion 54 has an actuator curvature 58. The actuator curvature 58 as illustrated is generally a hemispherical surface or approximates a rounded protruding bottom which directly contacts the guide surface 34. At the near zero vehicle acceleration the actuator 26 contacts the guide surface 34 at the contact point 100. An open slot 57 is shown above the surface contacting portion 54 and a beam structure 56 as shown.

FIG. 1 illustrates the inertial sensor mass 30 in an unlocking position. When in this position, the actuator 26 maintains the locking pawl 22 in an unlocked condition, allowing the seatbelt 18 to be withdrawn from the seatbelt retractor 14. The actuator 26 is pivotally mounted by a pivot 19 so as to rotate in the direction of arrow R in response to movement of the inertial sensor mass 30 in the direction of arrow P or in the direction of arrow Q. In the event of a quick acceleration or deceleration of a vehicle, such as in a crash, the inertial sensor mass 30 responds by moving either in the direction of arrow P or in the direction of arrow Q. In either direction, the actuator 26 moves in the direction of arrow R.

As shown in FIG. 2, the inertial sensor mass 30 is shown having moved in the direction of arrow P from the unlocking position 38 shown in FIG. 1 to a locking position 42. Movement of the inertial sensor mass 30 has caused the actuator 26 to move in the direction of arrow R from the position shown in FIG. 1. This movement of the actuator 26 causes the locking pawl 22 to engage the teeth of the locking wheel 28. The return movement of the inertial sensor mass 30 in the direction of arrow Q towards the unlocking position 38 causes a return of the actuator 26 in the direction of arrow S to the position shown in FIG. 1.

The first embodiment of the invention will now be explained in detail with reference to FIG. 1. As shown in FIG. 1, the guide surface 34 is located on a wide portion 46 above a narrow portion 50. While the figures show a particular shape of an exemplary sensor mass 30 upon which guide surface 34 sits, guide surface 34 may be implemented as any shape such as a sphere or cone shape. Under small amplitude vibration loading, actuator 26 can occasionally "jump" in direction R, momentarily losing contact between guide surface 34 and surface contacting portion 54. When actuator 26 rebounds back in direction S, contact will be re-established. Such intermittent contact can produce an audible rattle noise, which this invention seeks to eliminate. Beam structure 56 reduces the rattle noise by softening the contact between actuator 26 and guide surface 34. If beam structure 56 is made to be softer, the intermittent contact noise becomes quieter. If beam structure 56 is made to be stiffer, the intermittent contact noise becomes louder. If open slot 57 is removed completely, (i.e. in the absence of this invention) then there is no cushion at all and the intermittent contact noise would be as loud as possible. Open slot 57 is sized to be large enough that deflections of beam structure 56 due to vehicle vibrations will be unimpeded. Under higher loads, however, such as may occur during a rapid change in vehicle speed, open slot 57 is small enough to restrict beam structure 56 so that rapid locking can still occur with the sensor mass 30 tilting in the direction P or Q as shown in FIG. 2.

Figure 3:
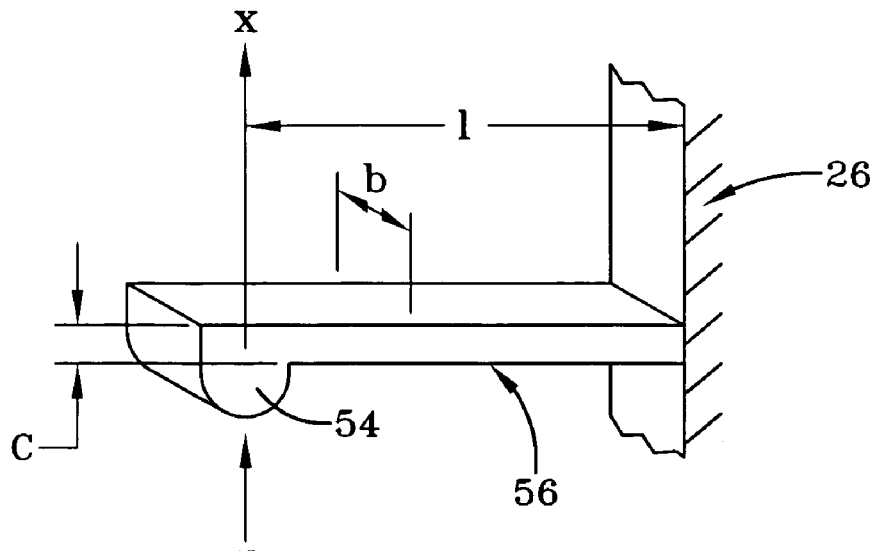
FIG. 3 outlines the engineering parameters in designing the actuator.
Figure 3A:
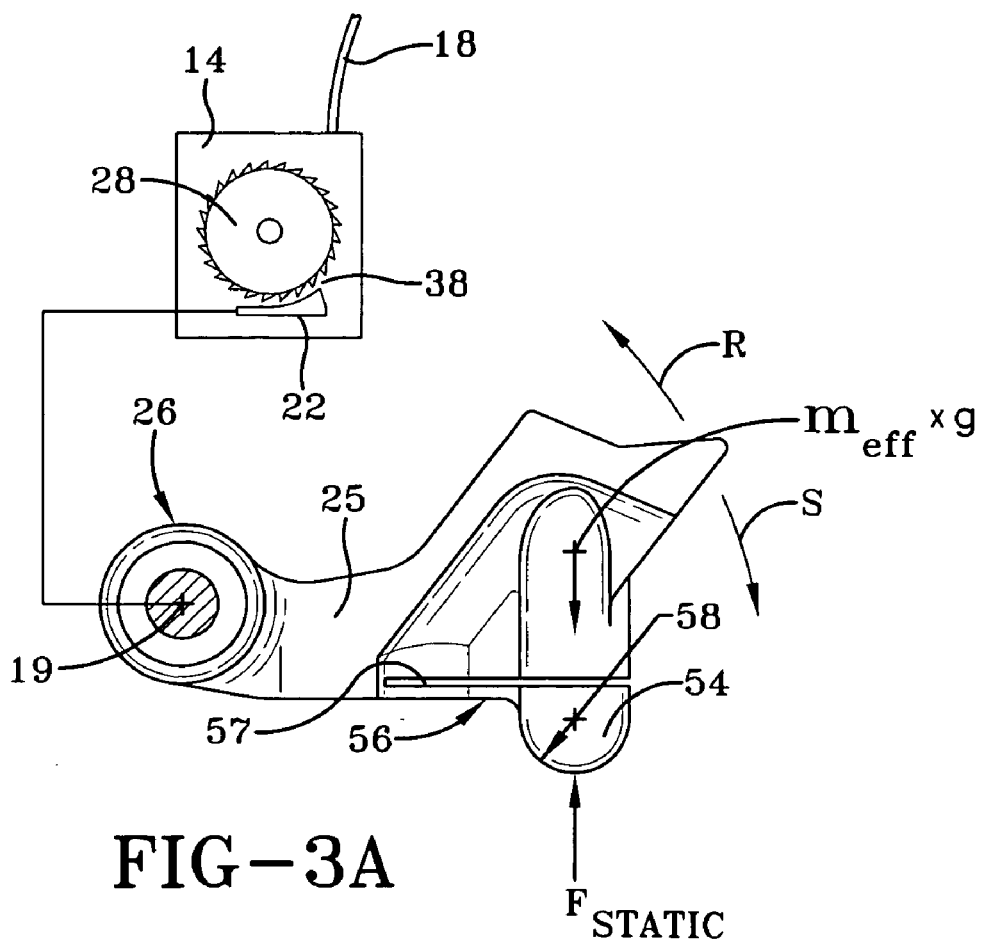
FIG. 3A illustrates the actuator of the present invention and the relationship between $F_{static}$ and $m_{eff}$.
Figure 4:
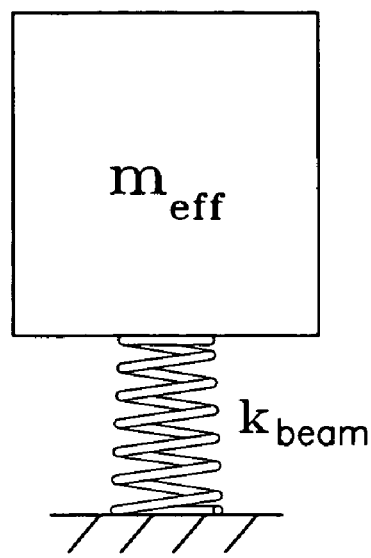
FIG. 4 is a schematic spring mass.

With reference to FIGS. 3, 3A and 4, the underlying principle of the invention can best be understood by using a spring-mass analogy. In other words the open slot 57 provides space for a limited amount of deflection of the actuator surface contacting portion 54 and the beam structure 56 relative to the actuator arm 25 of the actuator 26.

As shown in FIG. 3 the surface contacting portion 54 has a force F applied tending to put a load on the beam structure 56 to deflect it in the direction X. This load can be due to the static weight of the actuator 26 and it can also be due to impacts between the actuator 26 and the sensor 30.

Using classical beam theory, an idealized beam stiffness can be computed as follows: The beam structure as found in *Marks' Standard Handbook of Mechanical Engineering*, $10^{th}$ edition, has a thickness (c) and a width (b) and a length (l). Accordingly the beam structure acts like a leaf spring wherein the spring rate or spring constant $$K_{beam} = \frac{F}{X} = 3\frac{EI}{l^3} = \frac{Eb}{4}\left(\frac{c}{l}\right)^3$$

where E is the modulus of the actuator material. If the beam is more complicated than FIG. 3, then other analysis would be required, and this is understood by one of ordinary skill in the art.

FIG. 3A shows a Free Body Diagram associated with the actuator 26. Considering the sum of the torques about the pivot 19, it is seen that the actuator contact force, $F_{static}$, must equal $m_{eff}*g$ where $m_{eff}$ is the equivalent mass of actuator 26 if the CG (center of gravity) of the actuator 26 were placed directly over the actuator contact point 100; thus $m_{eff}=F_{static}/g$.

FIG. 4 shows an idealized spring-mass system analogous to the invention. An equivalent mass, $m_{eff}$ is supported by a spring whose spring rate is $K_{beam}$. This is equivalent to the actuator of FIG. 5 where the effective mass of the actuator 26 is supported by beam structure 56, the mass $m_{eff}$ being less than 150 grams. This means that the oscillation frequency (f) of the actuator 26 can be assumed to meet the equation $$f = \frac{1}{2\pi}\sqrt{\frac{K_{beam}}{m_{eff}}}; \quad \text{or} \quad \frac{1}{4\pi}\sqrt{\frac{Eb}{m_{eff}}}\left(\frac{c}{l}\right)^3$$

Note that the beam structure 56 can have more complicated geometry in which case more sophisticated analysis is required to compute the oscillation frequency f. Symbol F refers to a force and f to a frequency. The ratio of effective mass to contact stiffness indicates contact sharpness or impact stiffness. Accordingly the spring effect of the open slot 57 and beam structure 56 acts much like a low pass filter, wherein noise reduction were observed wherein (f)=300 Hz, (more typically (f) will be greater than 300 Hz generally 1000

Hz-1500 Hz however (f) can be designed to be as high as 20,000 Hz—the upper frequency limit of human hearing—and still have some remaining benefit). These noise reductions can be easily accomplished by adjusting the open slot length defining the beam length (l), the beam thickness (c) or beam width (b). In other words the geometry of the beam structure 56 can be adjusted to change the overall spring rate up or down as required to achieve the desired oscillator frequency to achieve a reduction in actuator rattle noise.

Figure 5:
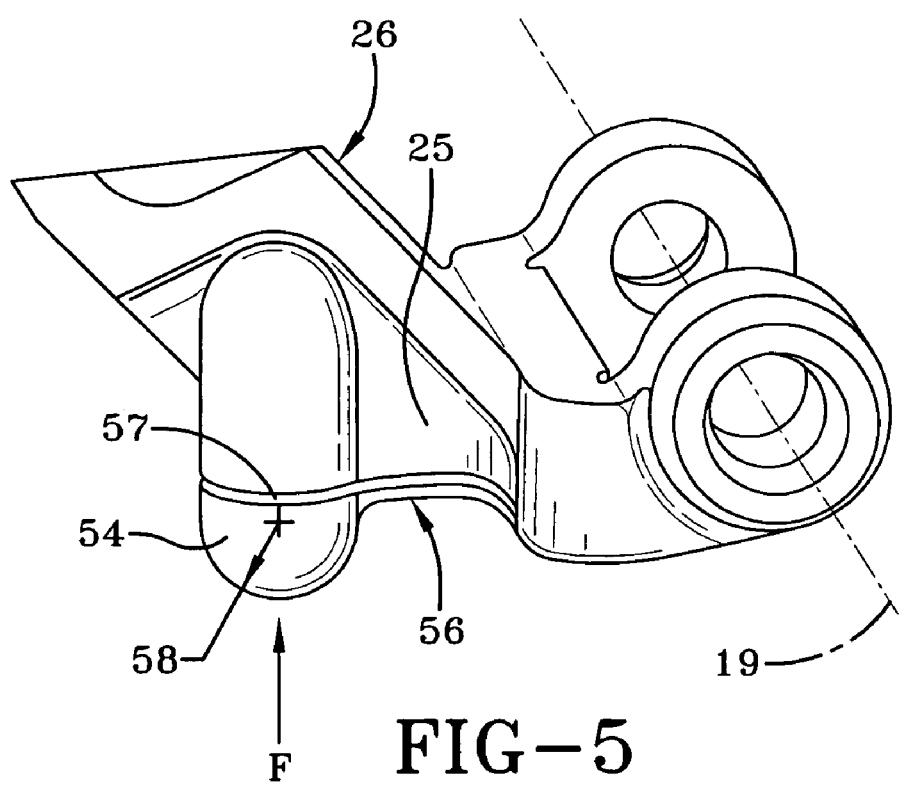
FIG. 5 illustrates a perspective view of the actuator.

With reference to FIG. 5, the actuator 26 is shown in a perspective view showing the actuator arm 25, the pivot axis 19, the open slot 57 with the surface contacting portion 54 and beam structure 56. As shown the actuator can be formed as unitary single piece structure by injection molding a plastic material. Preferably the actuator is made of acetyl, polypropylene, nylon or polyethylene or similar light weight easily molded material. The choice of materials could be almost any material including steel and aluminum as long as the desired spring like cushioning effect is achieved to reduce the contact noise.

While the open slot 57 is shown as a straight grooved opening in the actuator it is understood the shape of the opening can be varied to any variety of openings including wavy, triangular or curved with the resultant underlying beam structure optionally having an adjacent corresponding shape. The important aspect is that the open slot 57 provides a cushioning effect by providing a spring like beam structure 56 capable of minute deflections under normal vibrational inputs from a moving vehicle. Under an acceleration sufficient to create a locking of the seatbelt retractor the gap in the actuator 26 at the open slot 57 will close or otherwise be sufficiently small as to allow timely locking of the device. This also creates a lower impact noise as the actuator 26 moves to a locking engagement as shown in FIG. 2.

As used herein the term open slot 57 refers to a void volume. In the embodiment described in FIGS. 1 and 5 the open slot 57 was located directly above the surface contacting portion 54 and extending inwardly above the beam structure 56, the open slot 57 providing a gap sufficient to allow a flexure of the portions 54 and 56 and being completely open across the entire width of the surface contacting portion 54 and beam structure 56 during normal driving conditions.

While the open slot 57 is shown generally extending horizontally it is understood the open slot can be inclined or even bent extending above the surface contacting portion 54 into the actuator arm 25 to define a beam structure 56 of any desired geometric shape. Additionally, open slot 57 may have more complicated geometry such as a sawtooth pattern, for example. One skilled in the art will realize the usefulness of a nonplanar open slot.

Figure 6:
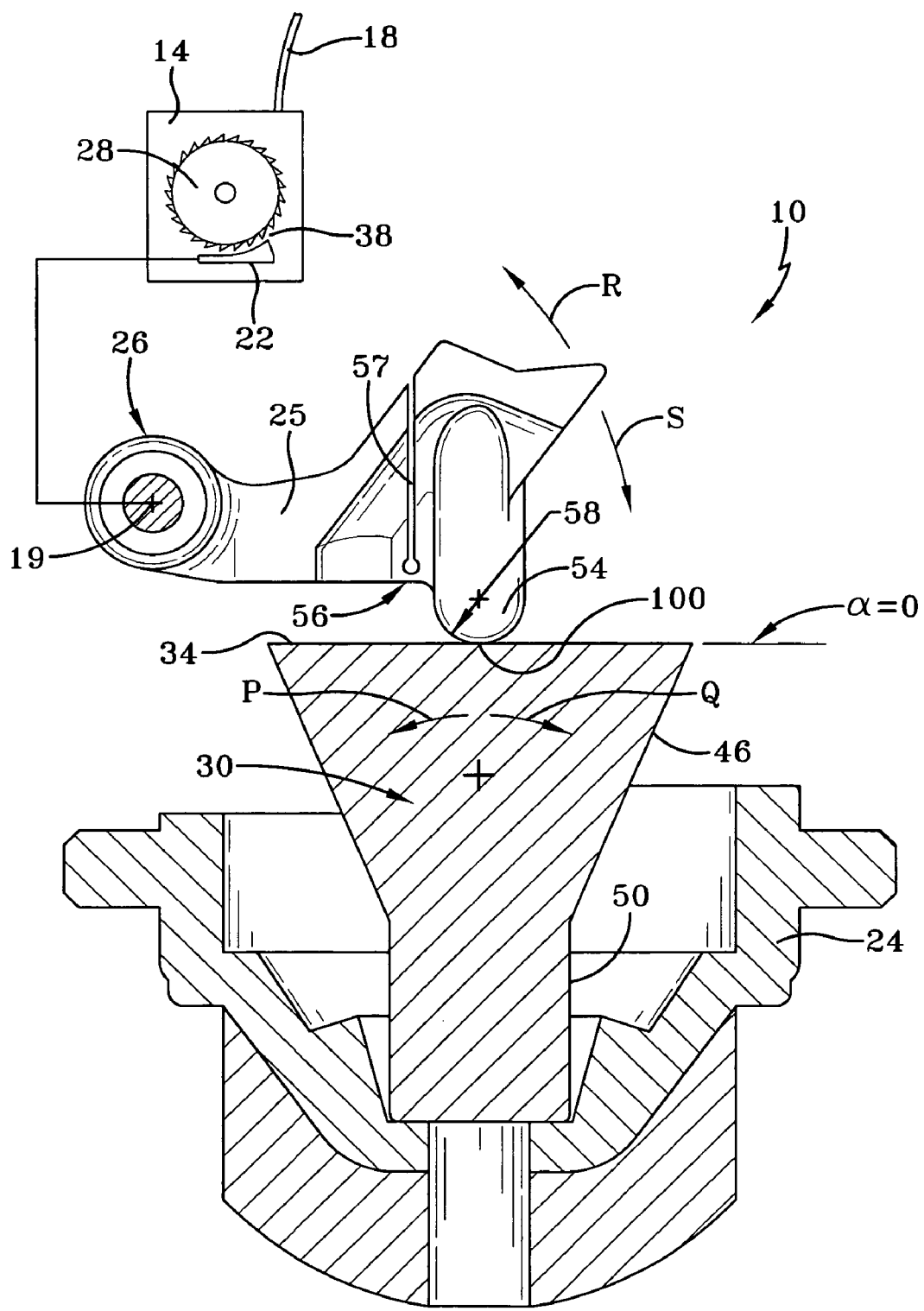
FIG. 6 illustrates a second embodiment of the invention.

With reference to FIG. 6 a second embodiment of the invention is shown wherein the actuator 26 has an open slot 57 that extends substantially vertically with an optional short enlarged end 59 such that the beam structure 56 as shown forms a relatively thin hinge which can reduce the impact noise upon locking into the lock position 42 as well as providing a spring like effect during normal driving conditions.

Preferably the open slot 57 is at least partially closed in the locked position and the flexibility of the beam structure 56 is sufficient to provide a noise reduction under normal driving condition use as well. As shown the open slot 57, 59 is above the surface contacting portion 54 but offset or located inwardly and extending generally vertically cutting across the width of the actuator arm 25.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A seatbelt retractor assembly comprising:
    a seatbelt retractor;
    an actuator for locking and unlocking the seatbelt retractor;
    an inertial sensor mass for detecting changes in vehicle acceleration, the inertial sensor mass having a guide surface for interacting with the actuator, the guide surface movable between an unlocking position wherein the actuator unlocks the seatbelt retractor and a locking position wherein the actuator locks the seatbelt retractor;
    wherein the actuator is a unitary single piece pivotal actuator arm having an open slot therein with the open slot having a substantially constant width along its length and a closed end of the open slot spaced apart from the pivot point of the pivotal actuator arm, the length of the open slot defining the length of a straight cantilever beam, and a surface contacting portion of the pivotal actuator arm is located at a free end of the straight cantilever beam, the contacting portion having a generally rounded protruded bottom resting on the guide surface of the inertial sensor mass, the straight cantilever beam can be deflected independent of the pivoting of the pivotal actuator arm, and the width of the open slot being large enough that deflection of the straight cantilever beam will be unimpeded during normal driving conditions and the width of the open slot being small enough to allow timely locking of the seatbelt retractor when a movement of the inertial sensor mass causes pivoting of the pivotal arm actuator.

2. The seatbelt retractor assembly of claim 1 wherein the straight cantilever beam has a spring rate $K_{beam}$, wherein $K_{beam}$ is sufficient to keep the slot open during normal sensor vibration.

3. The seatbelt retractor assembly of claim 1 wherein the actuator has an effective mass $m_{\textit{eff}}$ of less than 150 grams.

4. The seatbelt retractor assembly of claim 1 wherein the actuator is a molded plastic component.

* * * * *